March 14, 1961 G. J. SAXENMEYER 2,975,365

SHIFT REGISTER

Filed July 3, 1957 3 Sheets-Sheet 1

INVENTOR.
GEORGE J. SAXENMEYER

BY G. R. Gugger

AGENT

March 14, 1961 G. J. SAXENMEYER 2,975,365

SHIFT REGISTER

Filed July 3, 1957 3 Sheets-Sheet 2

1

2,975,365

SHIFT REGISTER

George J. Saxenmeyer, Vestal, N.Y., assignor to International Business Machines Corporation, New York, N.Y., a corporation of New York Filed July 3, 1957, Ser. No. 669,821

4 Claims. (Cl. 328—37)

Figure 1A:
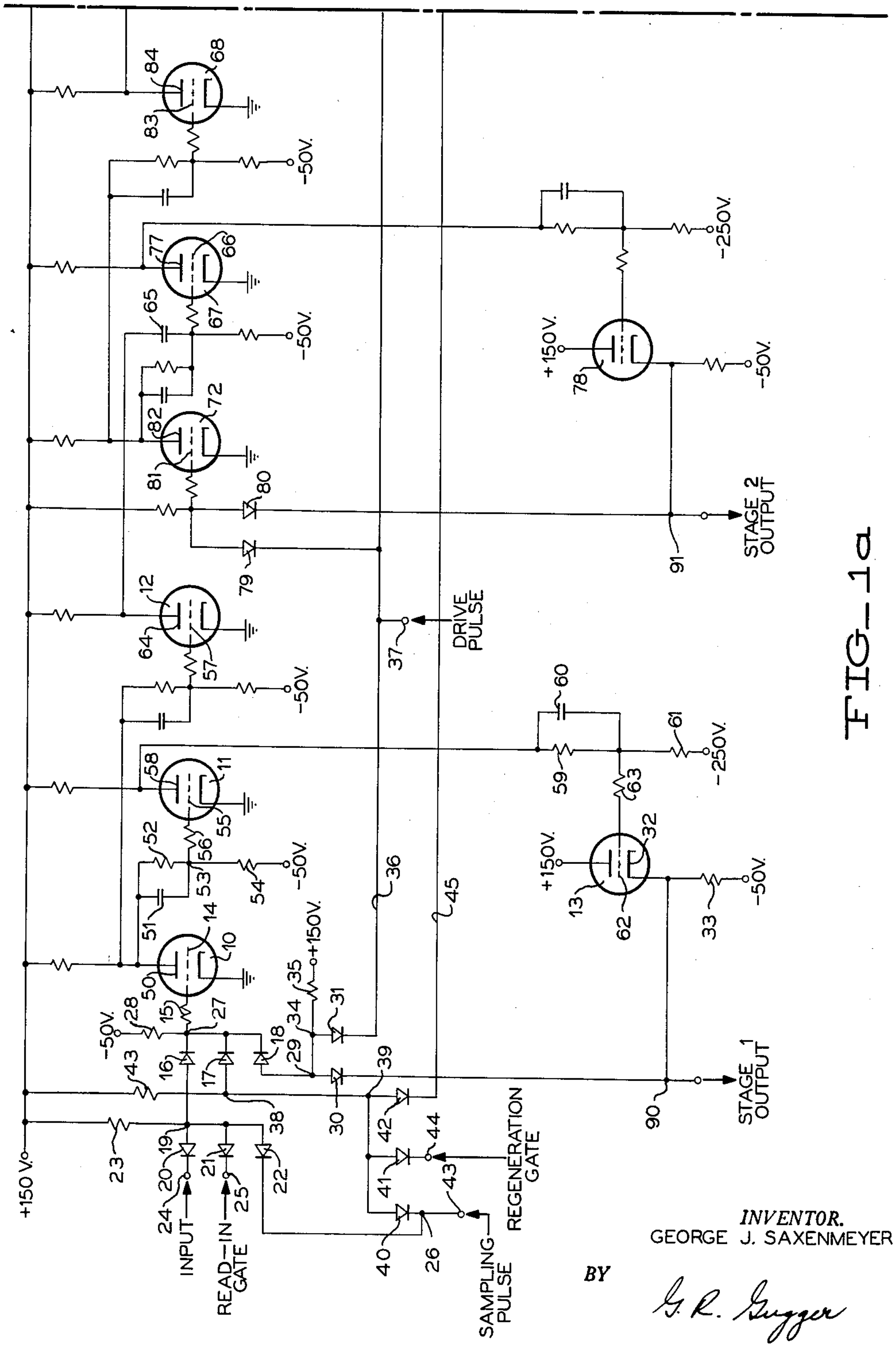

This invention relates to electronic storage devices, particularly the shifting register type, and its principal objects are to increase the flexibility and usefulness of such devices.

Electronic storage devices of the type contemplated by the present invention take the form of a latch ring circuit, such as is disclosed in U.S. Patent 2,628,309, issued to E. S. Hughes, Jr., on February 10, 1953, and are adapted to assume stable "on" and "off" conditions and to switch from one condition to the other in response to applied voltage pulses. In the latch ring shown in the above patent, each stage constitutes a storage device which includes a pair of inverters, a cathode follower which serves as an output tube and a pair of diodes arranged as a voltage coincidence switch. The voltages applied to the coincidence switch consist of a feedback voltage derived from the cathode follower of that stage, and a common input signal which is supplied concurrently to all of the stages. The stage which is "on" is held latched in that condition by the coincidence of the input signal and feedback voltage polarities. A reversal of the input signal polarity destroys this coincidence in the case of the stage which was "on," thereby turning said stage "off" and simultaneously turning the next stage "on," whereupon the aforesaid latching action is repeated in the case of the stage which is now "on." As is well known, a register of this type provides a simple and reliable device for storing binary coded information, a stage which is in an "on" condition indicating a binary "1" and a stage which is in an "off" condition indicating a binary "0." Due to the switching action between adjacent stages, which dictates that no adjacent stages may be "on" concurrently, the binary information is stored in alternate fashion; that is, 1, 0, 1, 0 or 0, 1, 0, 1, etc.

A basic and essential feature of recent computing systems is the provision of a register which will have the basic characteristics required for use as a program or instruction register. For example, serial entry is required for read-in of the instruction from its reference location in addressable storage elsewhere in the computing system. Serial readout is required to permit indexing (automatic address modification) of instructions. Parallel readout is required for operation of operation code matrices and address selection matrices by instructions directly from the register. Accordingly, it is the main object of the present invention to provide an improved register having means for storing serial digital information statically, means for reading out the stored information statically in parallel and means for reading out the stored information dynamically in serial form.

Another requirement in recent computer systems is a shifting register having the ability to store adjacent bits of information; that is, one wherein adjacent stages may be in an "on" condition concurrently. In prior art devices of this type the adjacent bits are lost during shifting operations. Accordingly, another object of the present invention is to provide an improved shifting register

2 which includes means which serve as a transitional storage medium for stored information bits during shifting operations.

In carrying out the foregoing objects, there is provided a novel latch ring circuit of the character described in the afore-mentioned patent and wherein each stage is provided with a third inverter connected between the output of the first inverter of a stage and the input to the second inverter of the following stage. The additional inverter in each stage couples the logical representation of stored binary 1's from one stage to the other under control of the drive pulses and serves as a storage medium for the information during shifting operations of the ring.

Other objects and features of the invention will be pointed out in the following description and claims and illustrated in the accompanying drawings, which disclose, by way of example, the principle of the invention and the best mode, which has been contemplated, of applying that principle.

Figure 1B:
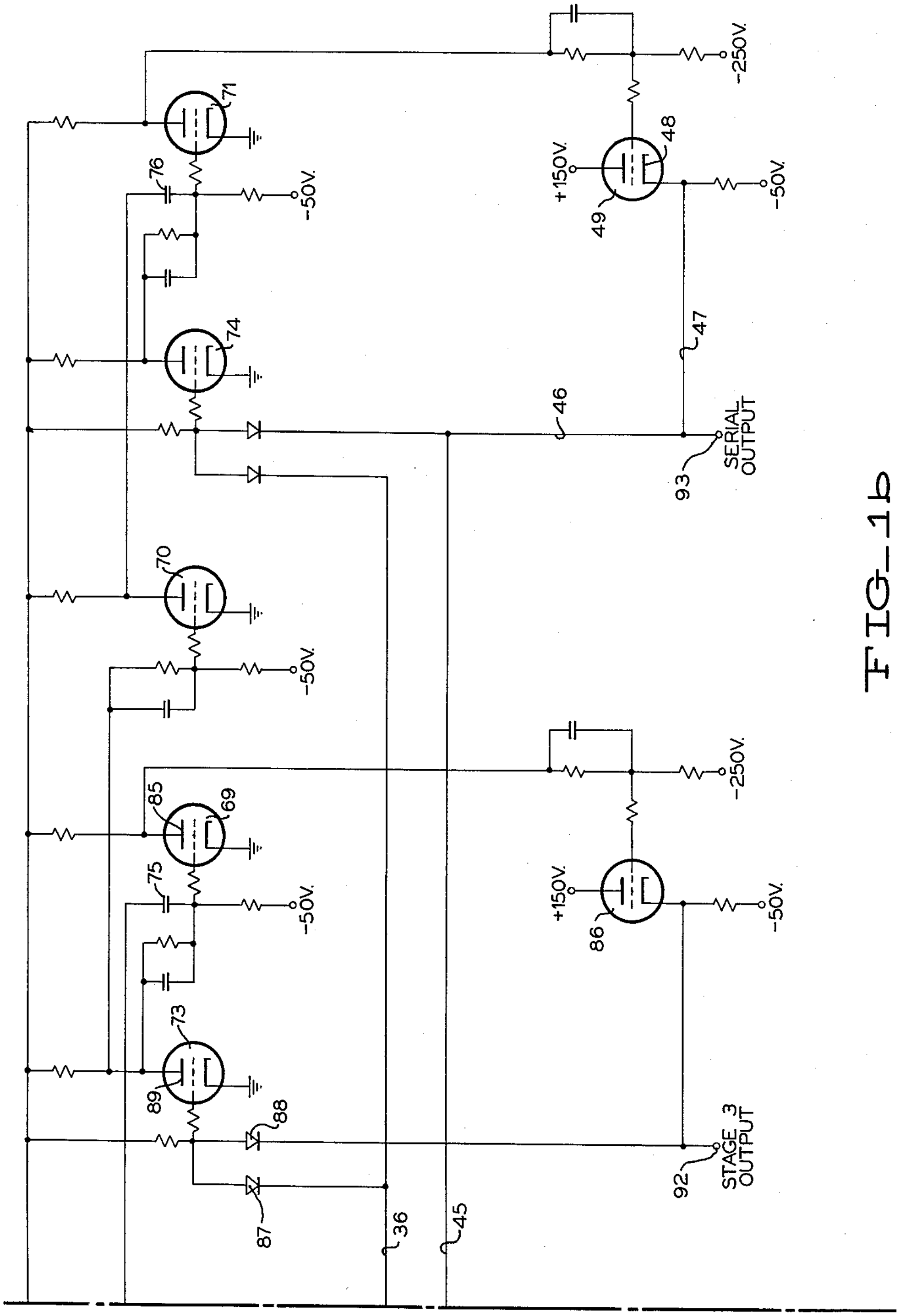

In the drawings:

Figs. 1*a* and 1*b* comprise a schematic showing of a ring circuit which embodies the principle of the invention.

Figure 2:
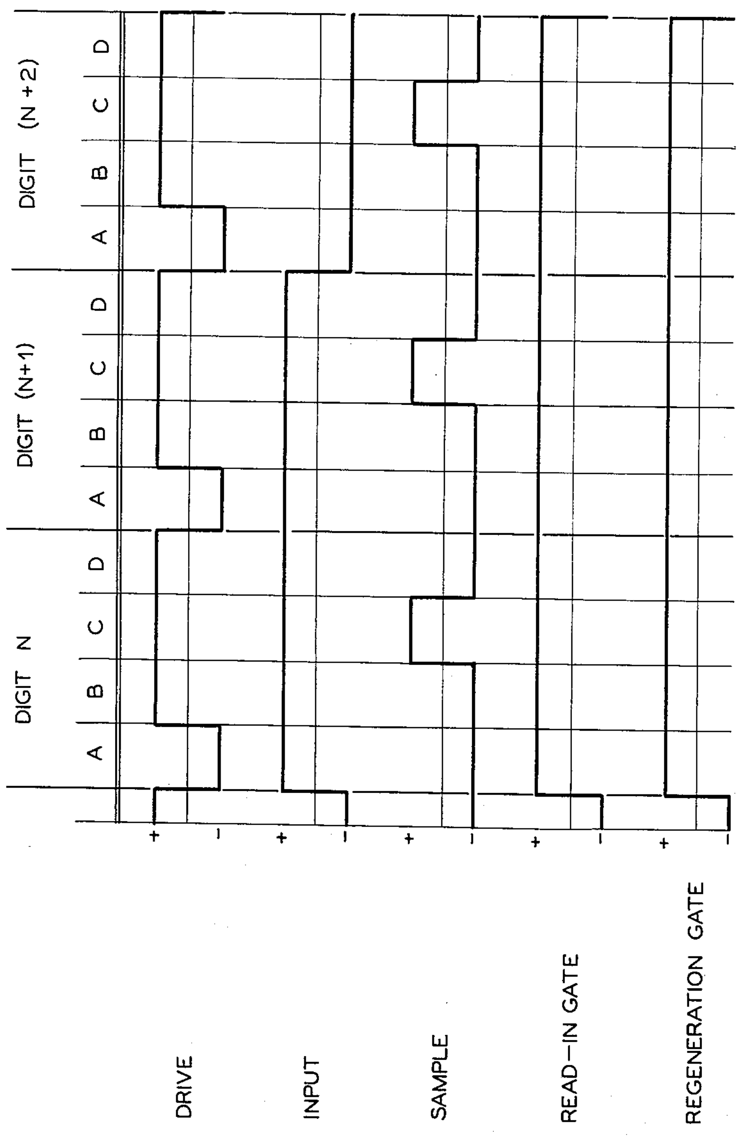

Fig. 2 is a timing diagram illustrating certain waveforms.

Figs. 1*a* and 1*b* illustrate schematically the stages of a 4 point ring wherein each stage except the last comprises a storage unit of the type contemplated by the present invention. For simplicity only 4 stages have been shown although it is to be understood that any desired number of stages embodying the present invention may be employed to make up a storage device. The first stage, for example, includes the triode inverters 10, 11 and 12 and a cathode follower 13. The grid 14 of the inverter 10 is connected through a resistor 15 and a diode 16 (the latter being an element of an "OR" switch comprising the diodes 16–18) to the terminal 19 of a positive coincidence switch comprising diodes 20–22. These diodes are generally germanium crystals, but other forms of diodes may be used if desired. The common terminal 19 of the diodes 20–22 is connected through a resistor 23 to a source of plate voltage represented as a +150 volt supply. The opposite terminals 24–26 are connected to various sources of input voltage waves which are supplied to the ring system.

The common terminal 27 of the diodes 16–18 is connected through a resistor 28 to a −50 volt supply and the opposite terminal 29 of the diode 18 is connected through a diode 30 (which serves as an element of a positive coincidence switch comprising the diodes 30 and 31) to the cathode 32 of the cathode follower 13, which cathode is connected through a load resistor 33 to a source of negative bias represented as a −50 volt supply. The common terminal 34 of the diodes 30 and 31 is connected through a resistor 35 to a source of plate voltage represented as a +150 volt supply. The diode 31 is connected to a line 36 through which an input drive voltage wave is supplied via terminal 37.

The opposite terminal 38 of diode 17 is connected to the common terminal 39 of a positive coincidence switch comprising the diodes 40–42, said terminal 38 also being connected through a resistor 43 to the +150 volt plate supply. Diodes 40 and 41 are connected to input terminals 43 and 44 through which additional input voltage waves are supplied to the ring system. The diode 42 is connected to a line 45 which is connected through lines 46 and 47 directly to the cathode 48 of the cathode follower 49 of the last stage of the ring system.

The plate 50 of the inverter 10 is connected through the parallel combination of a capacitor 51 and resistor 52 to a point 53, which point is connected through a resistor 54 to a negative bias supply (−50 volts). The grid 55 of the inverter 11 is connected through a resistor 56 to the point 53, the arrangement being such that when the inverter 10 is conducting, the voltage at the plate 50 thereof is sufficiently low so that the grid 55 of the inverter 11 is below cutoff. When the inverter 10 is not conducting, the voltage of the grid 55 is raised above cutoff and the inverter 11 conducts. In similar fashion, the plate 50 of inverter 10 is also connected to the grid 57 of the inverter 12 so that when the inverter 10 is not conducting, the inverter 12 conducts along with inverter 11.

When the first stage is "off," the inverter 10 is cut off and inverters 11 and 12 are conducting. The plate 58 of the inverter 11 is connected through a resistor 59 (by-passed by a capacitor 60) and a resistor 61 to a negative voltage source (—250 volts). The grid 62 of the cathode follower 13 is connected by a resistor 63 to the junction of the resistors 59 and 61. With the inverter 11 conducting, the voltage at the plate 58 thereof is sufficiently low so that the grid 62 of the follower 13 is below cut-off. Under these conditions the cathode 32 of the follower 13 is held at a negative potential. Due to the voltage drop in the resistor 35, the terminal 29 of the diode switch 30—31 is maintained at such a value that the inverter 10 is held below its cutoff point.

The plate 64 of inverter 12 is connected through a coupling capacitor 65 to the grid 66 of the second inverter 67 in stage two. In like fashion, the third inverter of each stage is connected to the second inverter of the following stage for purposes to be described, with the exception of the last or output stage which does not require a third inverter. In the initial "off" state of the ring the inverters 11, 12, 67, 68, 69, 70 and 71 are conducting and inverters 10, 72, 73 and 74 are cut off. The static D.C. potential at the plates of inverters 12, 68 and 70 does not effect cutoff of inverters 66, 69 and 71 due to the coupling capacitors 65, 75 and 76.

Fig. 2 illustrates the general type of voltage waveforms which are supplied from suitable sources within the computer to operate the ring. The drive voltage which is supplied to the terminal 37 is normally maintained at a steady positive value and at regular intervals a negative pulse is delivered, bringing the drive voltage down to a limiting negative value, as indicated during time "A," Fig. 2, "A" through "D" on the chart designating one "digit" time in the computer. A sampling voltage is supplied to the terminal 43 which is normally maintained at a steady negative value and at regular intervals a positive pulse is delivered, bringing the sampling voltage up to a limiting positive value, as indicated during time "C." A read-in gate voltage is supplied to the terminal 25 and if it is desired to regenerate the output information of the ring back into the ring, a regeneration gate voltage may be supplied to the terminal 44. Both of these gate voltages are normally negative and are driven positive and maintained at a limiting positive value throughout the desired cycle of ring operation. The input information is represented as a voltage having a normally steady negative value to designate a binary "0" and at intervals a positive pulse is delivered, bringing the input voltage up to a limiting positive value to designate a binary "1." As shown in Fig. 2, the input information for the three word cycles shown represents 1, 1, 0.

Any of the stages in the ring may be turned "on" by applying to the grid of the first inverter in that stage a positive pulse of a magnitude sufficient to start conduction. Thus assuming that all of the stages are "off," and that it is desired to enter 110 into the ring, at "C" time during the first input pulse there will be a positive coincidence between all of the input voltages, as shown in Fig. 2, and positive voltages applied to the terminals 24, 25 and 26 will result in a rise in potential at point 19. The rise in potential at point 19, through diode 16, causes a rise in potential at point 15 which raises the voltage of the grid 14 above the cutoff value. When inverter 10 starts conducting, the voltage of the plate 50 drops, thereby lowering the potential of the grid 55 in the inverter 11 below cutoff. The inverter 11 stops conducting, which causes the potential of its plate 58 to rise. Thereupon, the potential of the cathode follower grid 62 rises above cutoff. As the cathode follower 13 conducts, the cathode voltage thereof becomes positive, thereby applying positive potential to one of the elements 30 of the diode switch. At this time the drive pulse which is supplied to diode 31 via the input line 36 and terminal 37 has returned to its normal positive potential. The input pulse is made sufficiently long to insure that the positive output of the cathode follower 13 continues while the input line 36 is being restored to its positive potential. The resulting coincidence of positive voltages at the terminals of the diodes 30 and 31 raises the potential at point 29 and this is reflected through the diode 18 to insure that the grid 14 of the tube 10 will remain above cutoff and that the tube 10 will continue to conduct after the sample pulse has ceased. The first stage thus is "latched" in its "on" condition, with the positive feedback voltage from the cathode follower 13 and the positive input voltage on line 36 serving to hold the first stage in this condition.

The drop in potential at the plate 50 of the inverter 10 also lowers the potential of the grid 57 in the inverter 12 below cutoff. The inverter 12 stops conducting; however, the rise in potential at the plate 64 does not affect the inverter 67 which is conducting. With stage 1 turned "on" and stages 2 and 3 in the "off" state, the ring registers 1.

The next negative drive pulse at "A" time destroys the coincidence of positive voltages at the switch 30—31 with the line 36 now being at a negative potential. The grid 14 of the inverter 10 is thereby driven below cutoff, the inverter 11 starts to conduct, and the cathode follower 13 is cut off. The output of the cathode follower 13 now being negative, the grid 14 will not be permitted to rise above cutoff when the positive potential is restored to the line 36 and the first stage is held in its "off" condition. The rise in potential of plate 50 raises the grid 57 of inverter 12 above cutoff and inverter 12 conducts. The resulting drop in potential of plate 64 of inverter 12 lowers the potential of the grid 66 of inverter 67 turning inverter 67 "off." The rise in potential of plate 77 of inverter 67 turns cathode follower 78 "on" and the resulting positive cathode voltage thereof is supplied to the element 79 of the diode switch 79—80. As soon as the negative drive pulse restores to its positive potential, the coincidence of positive voltages at diodes 79 and 80 will raise the grid 81 of inverter 72 above cutoff and inverter 72 will be turned "on" and stage 2 will latch in its "on" condition.

The drop in potential at the plate 82 of the inverter 72 also lowers the potential of the grid 83 in the inverter 68 below cutoff. The inverter 68 stops conducting; however, the rise in potential at the plate 84 does not affect the inverter 69 which is conducting. With stage 1 turned "off" and stage 2 turned "on" the ring registers 01, the first input pulse having been shifted one position to the right.

As shown in Fig. 2, during the second read-in cycle the input voltage remains at its upper positive level indicating a second information bit and accordingly at "C" time when the positive sample pulse occurs, coincidence of positive voltages at the diode switch 20—22 turns the inverter 10 "on" and inverter 11 "off." The resulting drop in potential of the plate 50 of inverter 10 lowers the potential of the grid 57 of inverter 12 below cutoff and inverter 12 is turned "off." The potential at the plate 64 of inverter 12 rises; however, the arrangement is such that this rise in potential is not sufficient to overcome the cutoff bias (—30 volts) of the inverter 67 and inverter 67 remains in its "off" state and stage 2 remains latched in its "on" condition. The rise in potential of plate 58 of inverter 11 turns the cathode follower 13 "on" and the resulting positive cathode voltage thereof is supplied to the element 30 of the diode switch 30—31. As soon as the negative drive pulse restores again to its positive potential, the coincidence of positive voltages at diodes 30 and 31 will raise the grid 14 of the inverter 10 above cutoff turning inverter 10 "on" and stage 1 will latch in its "on" condition. With both stages 1 and 2 turned "on" the ring now registers 11.

The next negative drive pulse occurring at "A" time of the third read-in cycle destroys the coincidence of positive voltages at the switch 30—31 with the line 36 now being at a negative potential. The grid 14 of the inverter 10 is thereby driven below cutoff, inverter 11 starts to conduct, the cathode follower 13 is cut off and stage 1 is held in its "off" condition. The rise in potential of plate 50 raises the grid 57 of inverter 12 above cutoff and inverter 12 conducts. The negative drive pulse also destroys the coincidence of positive voltages at the switch 79—80, thereby turning the inverter 72 "off." The inverter 67 tries to conduct but is prevented from doing so because the drop in potential at the plate 64 of inverter 12 is sufficient to hold the grid 66 of inverter 67 below cutoff. The rise in potential at the plate 82 of inverter 72 turns inverter 68 "on." As soon as the negative drive pulse voltage restores to its positive value, coincidence of positive voltages is established at the diode switch 79—80 and the inverter 72 is latched "on" and the resulting drop in potential at the plate 82 reinforces the negative shift signal from inverter 12 to keep inverter 67 cut off.

When the inverter 68 was turned "on" the drop in potential at plate 84 turned the inverter 69 in stage 3 "off." The rise in potential at the plate 85 of inverter 69 turns the cathode follower 86 "on" resulting in a rise in potential at the cathode thereof. The drive voltage on line 36 having returned to its positive value, coincidence of positive voltages is now established at the diode switch 87—88 and the inverter 73 is latched "on." The drop in potential at the plate 89 of inverter 73 turns the inverter 70 "off." As shown in Fig. 2, the input voltage drops to its negative value at the start of the third read-in cycle and remains there. Hence, stage 1 remains in its "off" condition and the read-in of the information has been completed. With stage 1 "off" and stages 2 and 3 "on," the ring now registers 011, the last stage being the high order stage.

The information stored in the ring may be read out of the three stages in parallel through the parallel output terminals 90, 91 and 92 or the information bits may be read out in serial fashion through stage 4 and the serial output terminal 93.

To read the information out serially the negative drive pulses are continued to shift the information bits to the right in the same manner as has been described. For example, the next negative drive pulse will destroy the coincidence at the diode switch 87—88 thereby turning inverter 73 "off." As a result, inverter 70 will turn "on" and the inverter 71 in stage 4 will turn "off" firing the cathode follower 49 which supplies a positive output for the first information bit to the output terminal 93. Also the drive pulse destroys the coincidence at the diode switch 79—80 turning inverter 72 "off," inverter 68 "on" and inverter 69 in stage 3 "off" thereby transferring the "1" bit in stage 2 to stage 3. Similarly, the next drive pulse will transfer the "1" bit from stage 3 to stage 4 and the output terminals 93.

It is evident that as the drive pulses are continued to shift the stored information to the serial output terminal 93 new input information may be concurrently entered into the ring through the diode switch 20—22.

If it is desired to regenerate the information back into the ring, it is only necessary to maintain the regeneration gate voltage at its positive level throughout the regeneration cycle. The outputs from the cathode follower 49 are fed back over the lines 47, 46 and 45 to the element 42 of the diode switch 40—42. Coincidence of positive voltages from the output information, the sampling pulses and the regeneration gate pulse will cause the re-entry of the information into the ring through the diode switches 40—42 and 16—18.

To cancel the ring suitable means may be provided to raise the negative 50 volt grid supplies up to ground potential thereby turning the inverters 11, 67, 69 and 71 "on."

While there have been shown and described and pointed out the fundamental novel features of the invention as applied to a preferred embodiment thereof, it will be understood that various omissions and substitutions and changes in the form and details of the illustrated devices and in its operation may be made by those skilled in the art, without departing from the spirit of the invention. It is the intention, therefore, to be limited only as indicated by the scope of the following claims.

What is claimed is:

1. An electron ring having a plurality of stages, means for supplying input information signals in serial fashion to the first stage and means for supplying a common drive signal to all stages to shift information stored in said ring from stage to stage thereof, said ring comprising, in each of said stages a first inverter controlled by said common drive signal means for assuming alternate states of maximum and minimum conductivity in response to variations of the drive signal, a second inverter controlled by said first inverter for assuming a conductive state opposite to that of said first inverter, feedback means including a cathode follower coupling said second inverter to said first inverter for maintaining said first inverter in the state of conductivity which said first inverter has assumed in response to said drive signal, the cathode followers providing parallel static readout of the information stored in said ring, a third inverter coupled between the output of the first inverter of each stage and the input of the second inverter of the next succeeding stage, and means including said third inverter to provide a negative signal when the two adjacent stages coupled thereby and having their first inverters conducting and their second inverters nonconducting are under the influence of said drive signal for a shifting operation, said negative signal serving to prevent the latter of said two adjacent stages from switching during said shifting operation.

2. A normally open ended electronic ring having a plurality of stages, said ring comprising, in each of said stages a first inverter having a control electrode and adapted to assume alternate states of maximum and minimum conductivity in response to predetermined voltages of differing polarities impressed upon said electrode, a second inverter controlled by said first inverter, a cathode follower controlled by said second inverter for furnishing output voltages of differing polarities in accordance with the conductive state of said second inverter, an input conductor for supplying to the ring device input voltages of varying magnitudes and polarities, a second conductor for supplying to the ring drive voltages of varying magnitudes and polarities, a coincidence switch including a pair of diodes respectively connected to said second conductor and to said cathode follower for latching said first inverter in one of its alternate conductive states when both the drive voltage and the cathode follower output voltage are of a given polarity, a third inverter coupling the first inverter of each stage to the second inverter of the next succeeding stage, means including said third inverters for producing negative control signals so that similar states of conductivity in adjacent stages may be effected, and coincidence switching means connecting the cathode follower output of the last stage to the input of the first inverter in the first stage to selectively close said ring.

3. An electron ring having at least three stages, means for supplying input information signals in serial fashion to the first stage and means for supplying a common drive signal to all stages to shift information stored in said ring from stage to stage thereof, said ring comprising, in each of said stages a first inverter controlled by said common drive signal means for assuming alternate states of maximum and minimum conductivity in response to variations of the drive signal, a second inverter controlled by said first inverter for assuming a conductive state opposite to that of said first inverter, feedback means including a cathode follower coupling said second inverter to said first inverter for maintaining said first inverter in the state of conductivity which said first inverter has assumed in response to said drive signal, the cathode followers providing parallel static readout of the information stored in said ring, a third inverter coupled between the output of the first inverter of each stage and the input of the second inverter of the next succeeding stage, and means including said third inverters to provide negative signals when the first and second stages coupled thereby and having their first inverters conducting and their second inverters nonconducting are under the influence of said drive signal for a shifting operation, said negative signals serving to prevent the second stage from switching and to insure switching of the third stage during said shifting operation.

4. An electronic ring having a plurality of stages, said ring comprising, in each of said stages a first inverter having a control electrode and adapted to assume alternate states of maximum and minimum conductivity in response to predetermined voltages of differing polarities impressed upon said electrode, a second inverter controlled by said first inverter, a cathode follower controlled by said second inverter for furnishing output voltages of differing polarities in accordance with the conductive state of said second inverter, an input conductor for supplying to the ring device positive input pulses, a second conductor for supplying to the ring negative drive pulses to effect a shifting operation, a positive coincidence switch including a pair of diodes respectively connected to said second conductor and to said cathode follower for latching said first inverter in its state of maximum conductivity when both the drive pulse and the cathode follower output voltage are positive, a third inverter coupling the first inverter of each stage to the second inverter of the next succeeding stage, means including said coupling inverters and effective during the presence of a negative drive pulse to the ring to couple a negative signal from those first inverters which are in a maximum state of conductivity to the second inverters of the succeeding stages to prevent said second inverters from switching during the duration of said negative drive pulse, and coincidence switching means connecting the cathode follower output of the last stage to the input of the first inverter in the first stage to selectively close said ring.

References Cited in the file of this patent

UNITED STATES PATENTS

| | | |
|---|---|---|
| 2,596,741 | Tyler et al. | May 13, 1952 |
| 2,628,309 | Hughes | Feb. 10, 1953 |
| 2,790,076 | Mason | Apr. 23, 1957 |
| 2,824,961 | Paivinen | Feb. 25, 1958 |

OTHER REFERENCES

Convention Record of the IRE, part IV, 1954, pages 140–44. "Transistor Shift Registers," by Huang et al.